United States Patent [19]

Kuno

[11] Patent Number: 5,572,382
[45] Date of Patent: Nov. 5, 1996

[54] MAGNETIC DISK DRIVE HAVING BALANCED MAGNETIC DISK MOUNTED ON ROTOR OF MOTOR

[75] Inventor: Hiroyuki Kuno, Tokyo, Japan

[73] Assignee: Kabushiki Kaisha Toshiba, Kanagawa-ken, Japan

[21] Appl. No.: 223,692

[22] Filed: Apr. 6, 1994

[30] Foreign Application Priority Data

Apr. 7, 1993 [JP] Japan ................................... 5-080921

[51] Int. Cl.⁶ .................................................. G11B 17/08
[52] U.S. Cl. .......................................... 360/98.08; 73/459
[58] Field of Search .................................. 360/98.07–.08; 73/66, 459–461

[56] References Cited

U.S. PATENT DOCUMENTS

| 4,561,035 | 12/1985 | McDorman | 360/137 |
|---|---|---|---|
| 4,563,824 | 1/1986 | Baun . | |
| 4,683,505 | 7/1987 | Schmidt et al. . | |
| 4,754,351 | 6/1988 | Wright . | |
| 4,933,927 | 6/1990 | Ross . | |
| 5,043,973 | 8/1991 | Ocheltree et al. . | |
| 5,130,870 | 7/1992 | Jabbari | 360/137 |
| 5,214,326 | 5/1993 | Yonei | 360/98.08 |
| 5,216,304 | 6/1993 | Ohta | 360/98.08 |

FOREIGN PATENT DOCUMENTS

| 62-13754 | 3/1987 | Japan . |
|---|---|---|
| 2-9070 | 1/1990 | Japan . |
| 2-79278 | 3/1990 | Japan . |

*Primary Examiner*—A. J. Heinz
*Attorney, Agent, or Firm*—Limbach & Limbach

[57] ABSTRACT

A magnetic disk drive comprises a motor having a substantially cylindrical rotor, and three magnetic disks each having a center hole in which the rotor is inserted, and fitted on the outer circumferential surface of the rotor. The magnetic disks are displaced in a direction along the diameter of the rotor so that the inner circumferential edge of each magnetic disk defining the center hole is pressed against the outer circumferential surface of the rotor. The magnetic disks are fixed to the rotor by a fixing member mounted on the rotor. A counterweight for correcting the balance of the magnetic disk in rotation is mounted on the fixing member in the vicinity of that region of the outer circumferential surface of the rotor against which the inner circumferential edges of the magnetic disks are pressed.

8 Claims, 8 Drawing Sheets

MAGNETIC DISK DRIVE HAVING BALANCED MAGNETIC DISK MOUNTED ON ROTOR OF MOTOR

BACKGROUND OF THE INVENTION

1. Field of the Invention

The present invention relates to a magnetic disk drive, for use as a memory device in a laptop or book-type portable electronic apparatus, and an assembling method therefor.

2. Description of the Related Art

A magnetic disk drive with large memory capacity and high-speed access performance is conventionally known as a memory device which is used in a laptop or book-type portable electronic apparatus. For example, a hard disk drive (hereinafter referred to as HDD) comprises a magnetic disk, a motor for rotating the disk, a magnetic head for data recording and retrieval for the disk, a carriage supporting the head, etc. These components are contained in a housing.

Each magnetic disk has a hole in the center. The motor is provided with a cylindrical rotor which rotates about a motor shaft. The rotor is fitted in the center hole of the magnetic disk. The disk is fixedly supported on the rotor by means of a fixing member.

Recently, there has been an increasing demand for high-performance, large-capacity HDDs. This demand can be met by increasing the rotational speed of the magnetic disk or the motor speed and the number of the disks mounted on the rotor of the motor.

When the magnetic disk is mounted on the rotor of the motor and rotated together with the rotor, in one such HDD, the rotation of the disk is unbalanced if the disk is eccentric to the center of rotation of the rotor, and this unbalance causes the rotor and the disk to vibrate. If the motor speed and the number of the magnetic disks mounted on the rotor are increased as aforesaid, influences of the unbalanced rotation of the disks are enhanced, so that the vibrations of the rotor and the disks attributable to the rotation further increase.

In some cases, the increase of the vibrations of the rotor and the disk may exert a bad influence upon the performance of the electronic apparatus which is furnished with the HDD, as well as upon the positioning accuracy of the magnetic head with respect to the disk. In the case of a compact electronic apparatus, such as a book-type personal computer, the HDD may vibrate to cause vibrations of a keyboard, thereby giving an operator an unpleasant feeling.

In the case of a 2.5-inch magnetic disk, for example, a gap of about 5 to 90 µm is generally formed between the inner circumferential edge of the disk, which defines the center hole, and the outer circumferential surface of the rotor. Owing to this gap, the magnetic disk and the rotor become eccentric to each other, thus causing the rotation of the disk to be unbalanced.

The unbalance force (centrifugal force) for each disk is represented by $F = m \cdot e \cdot \omega^2$, where m, e, and ω are the mass, eccentricity, and rotational speed of the magnetic disk, respectively. If aluminum disks with a thickness of 0.889 mm are rotated at the speed of 3,600 rpm with the gap of 90 µm between the edge of each disk center hole and the outer circumferential surface of the rotor of the motor, the unbalance force for each disk, based on the aforesaid equation, is $$F = \{¼(65^2 - 20^2) \times \pi \times 0.889 \times 2.7 \times 10^{-6}\} \times (90 \times 10^{-6}/2) \times (2\pi \times 60)^2 = 0.046N.$$

If the weight M of the HDD is 200 g, vibrations of the HDD caused by the unbalance force, based on $F = M\alpha$ (α is acceleration), is $\alpha = F/M = 0.046/200 \times 10^{-3} = 0.23$ m/S².

As the rotational speed and the number of the mounted magnetic disks increase, the unbalance force and the vibrations increase correspondingly.

Described in Jpn. Pat. Appln. KOKAI Publication No. 2-79278 (Fujitsu, Ltd.), for example, is a disk drive in which the outer circumferential surface of the rotor has a special shape such that a rotor and disks can be fixed concentrically. More specifically, the rotor has an outer circumferential surface with an outer diameter smaller than the inner diameter of the disks and a pair of projections protruding from the outer circumferential surface. The extending end face of each projection is in the form of a circular arc whose diameter is equal to the inner diameter of the disks. Each disk is aligned with the rotor by causing its inner circumferential edge to abut against the projections. A counterweight for balancing with the projections is provided on that region of the rotor on the opposite side thereof to the rotor.

If the rotor or the disks in this conventional arrangement are subject to a dimensional error as a manufacturing error, however, it is difficult to align the disks perfectly with the rotor. In an apparatus which uses a large number of disks or in which the disks are rotated at high speed, therefore, the rotor and the disks are unbalanced in rotation, and generate vibrations.

According to a magnetic disk drive disclosed in U.S. Pat. No. 6,483,505, moreover, a plurality of disks are fixed to a rotor in a manner such that they are alternately shifted in the diametrical direction of the rotor so that their respective inner circumferential edges abut against the outer circumferential surface of the rotor in positions situated at intervals of 180° in the circumferential direction, whereby the disks are balanced.

In the case where an odd number of disks are used in this arrangement, however, unbalance for one disk is sure to remain and appear as vibrations when the disks are rotated.

Thus, according to the conventional arrangement, no effective measure is taken to meet the unbalance force produced by the rotation of the magnetic disks.

SUMMARY OF THE INVENTION

The present invention has been contrived in consideration of these circumstances, and its object is to provide a magnetic disk drive capable of restraining a magnetic disk from being unbalanced as it rotates and of reducing vibrations attributable to unbalance.

In order to achieve the above object, a magnetic disk drive according to the present invention comprises a motor having a substantially cylindrical rotor rotatable around a motor shaft, a magnetic disk having a center hole in which the rotor is inserted, and fitted on the outer circumferential surface of the rotor, and a fixing member mounted on the rotor and fixing the magnetic disk to the rotor. The magnetic disk is displaced in a direction along the diameter of the rotor so that the inner circumferential edge of the magnetic disk defining the center hole is pressed against the outer circumferential surface of the rotor. In the vicinity of that region of the outer circumferential surface of the rotor against which the inner circumferential edge of the magnetic disk is pressed, the fixing member is fitted with a counterweight which serves to correct the balance of the magnetic disk in rotation.

An assembling method for a magnetic disk drive according to the present invention comprises the steps of mounting the magnetic disk on the rotor in a manner such that the rotor is inserted in the center hole, moving the mounted magnetic disk in a direction along the diameter of the rotor so that the inner circumferential edge of the magnetic disk defining the center hole is pressed against the outer circumferential surface of the rotor, fixing the pressed magnetic disk to the rotor by means of the fixing member, rotating the rotor and the fixed magnetic disk and measuring the degree of unbalance of the magnetic disk and the rotor in rotation, and mounting a counterweight for correcting the measured unbalance degree on the fixing member, in the vicinity of that region of the outer circumferential surface of the rotor against which the inner circumferential edge of the magnetic disk is pressed.

According to the magnetic disk drive and the assembling method described above, the respective weights of the magnetic disk and the counterweight for unbalance correction are distributed to positions symmetrical with respect to the motor shaft as the disk is fitted on the rotor of the motor, so that the rotation of the disk is restrained from being unbalanced. Thus, vibrations of the disk drive can be reduced.

An alternative magnetic disk drive according to the present invention comprises a motor having a substantially cylindrical rotor rotatable around a motor shaft and three or more magnetic disks each having a center hole in which the rotor is inserted and fitted on the outer circumferential surface of the rotor. The magnetic disks are displaced toward the central axis of the motor shaft, respectively along lines defining angles of the same value which is obtained by dividing 360 degrees by the number of the magnetic disks so that the inner circumferential edge of each magnetic disk defining the center hole is pressed against the outer circumferential surface of the rotor.

An assembling method for the magnetic disk drive described above comprises the steps of mounting the magnetic disks on the rotor in a manner such that the rotor is inserted in the respective center holes of the disks, moving the mounted magnetic disks toward the central axis of the motor shaft, respectively along lines defining angles of the same value which is obtained by dividing 360 degrees by the number of the magnetic disks so that the inner circumferential edge of each magnetic disk defining the center hole is pressed against the outer circumferential surface of the rotor, and fixing the pressed magnetic disks to the rotor by means of a fixing member.

According to the magnetic disk drive and the assembling method described above, the respective weights of the three or more magnetic disks are distributed at regular intervals on the circumference of a circle around the motor shaft. Thus, the rotation of the disks is restrained from being unbalanced, so that vibrations attributable to this unbalance can be reduced.

An alternative assembling method according to the present invention comprises the steps of mounting a magnetic disk on the rotor in a manner such that the rotor is inserted in the center hole of the disk, moving the mounted magnetic disk in a first direction along the diameter of the rotor so that the inner circumferential edge of the magnetic disk defining the center hole is pressed against the outer circumferential surface of the rotor, moving the magnetic disk in a second direction opposite to the first direction so that the inner circumferential edge is pressed against the outer circumferential surface of the rotor, measuring a first moved distance of the magnetic disk in the second direction, moving the magnetic disk for half the measured first moved distance in the first direction, moving the magnetic disk in a third direction along the diameter of the rotor and perpendicular to the first-direction so that the inner circumferential edge of the magnetic disk is pressed against the outer circumferential surface of the rotor, moving the magnetic disk in a fourth direction opposite to the third direction so that the inner circumferential edge is pressed against the outer circumferential surface of the rotor, measuring a second moved distance of the magnetic disk in the fourth direction, moving the magnetic disk for half the measured second moved distance in the third direction, and fixing the magnetic disk, moved for half the first moved distance and half the second moved distance, to the rotor by means of the fixing member.

According to the assembling method described above, the center of gravity of the magnetic disk is made to be substantially coincident with the center of rotation of the rotor by centering the disk with respect to the rotor so that the gap between the center hole of the disk and the outer circumferential surface of the rotor is uniform throughout the circumference. Thus, the rotation of the disks is restrained from being unbalanced, and vibrations attributable to this unbalance can be reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 3 show an HDD according to a first embodiment of the present invention, in which:

FIGS. 5 to 7 show an HDD according to a second embodiment of the invention and an assembling method therefor, in which:

FIGS. 8A to 10 show an HDD according to a third embodiment of the invention and an assembling method therefor, in which:

DETAILED DESCRIPTION OF THE PREFERRED EMBODIMENTS

An embodiment of the present invention applied to a 2.5-inch hard disk drive (HDD) to be used in a portable electronic apparatus will be described in detail.

Figure 1:
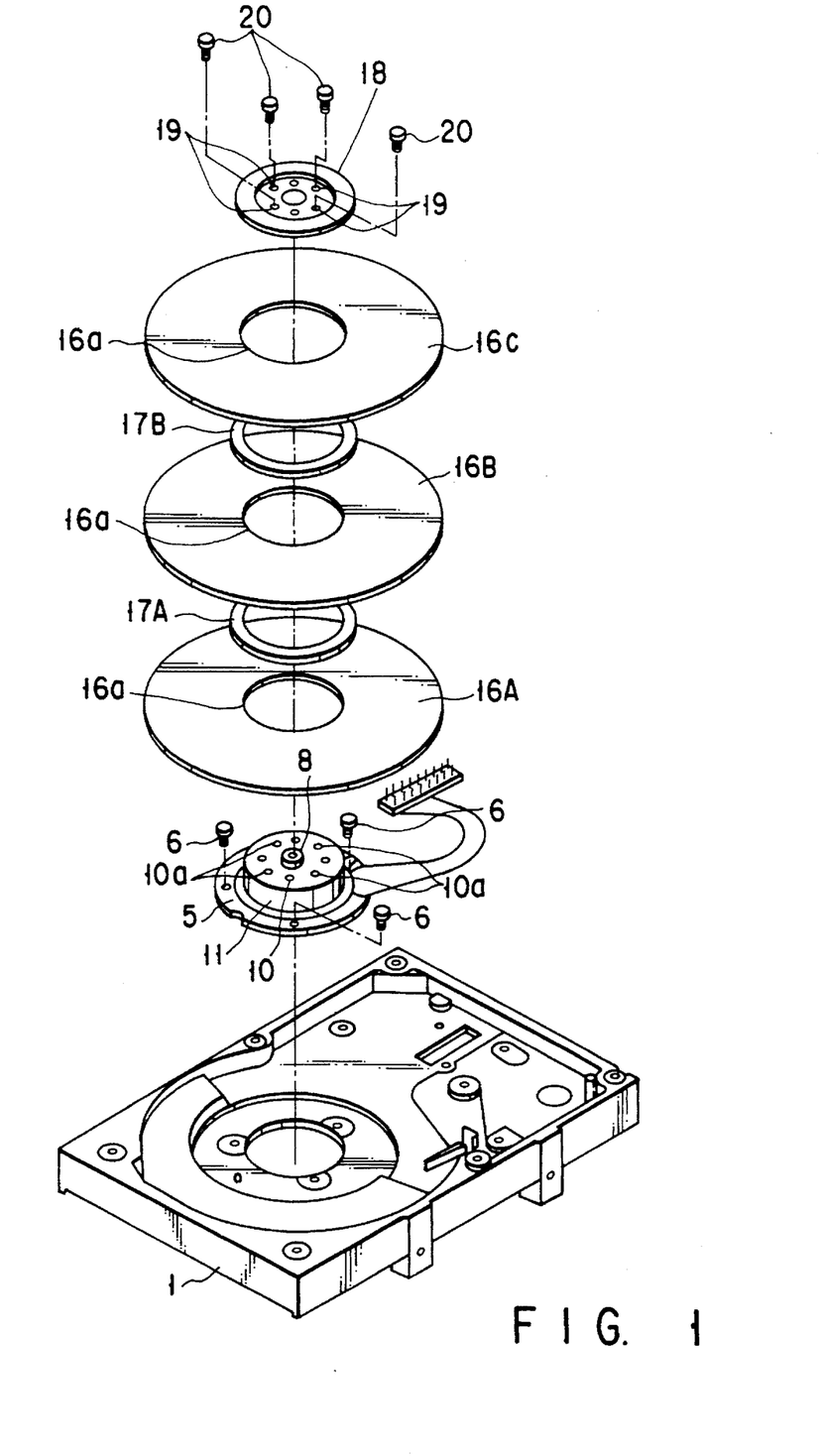
FIG. 1 is an exploded perspective of the HDD.
Figure 2:
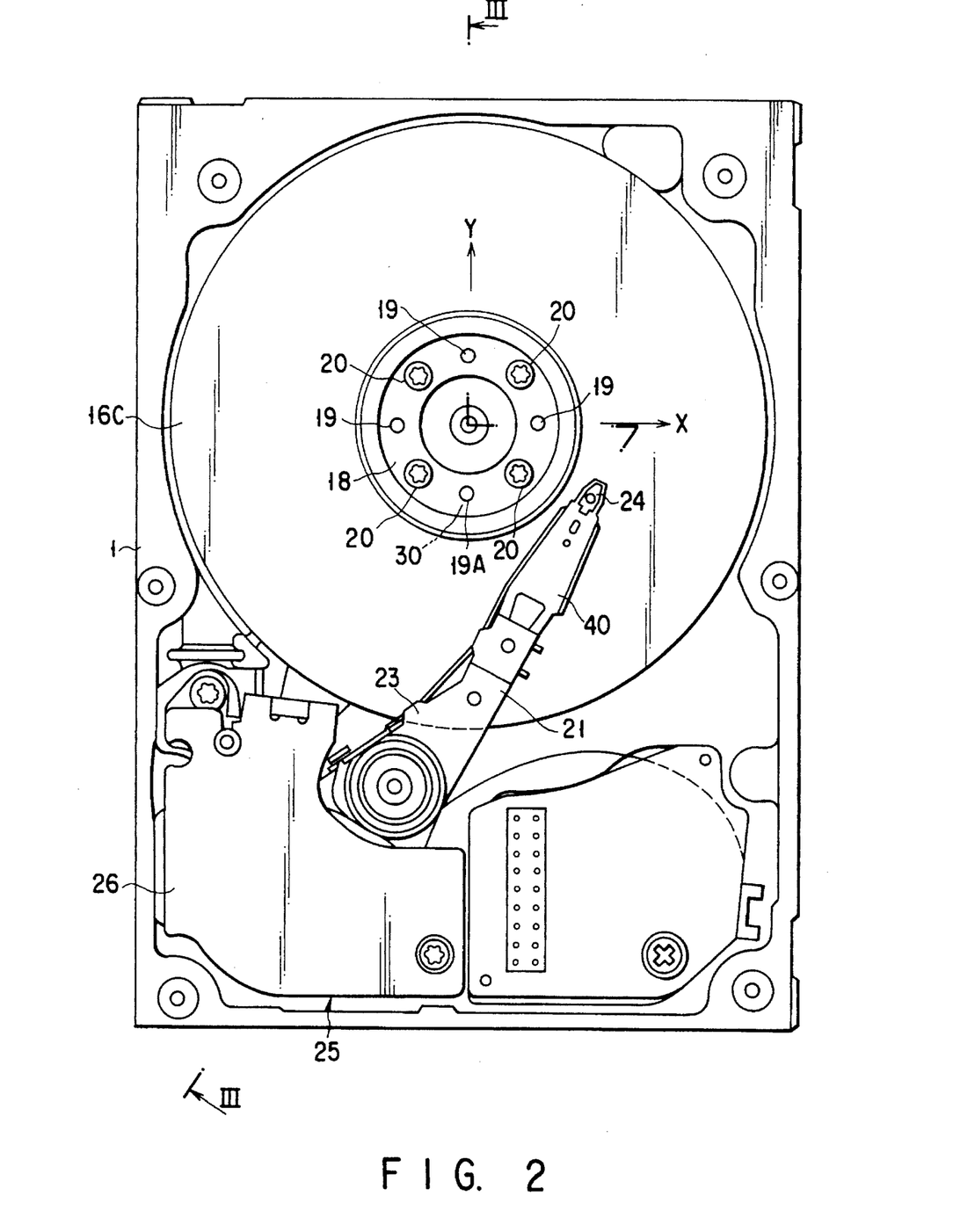
FIG. 2 is a plan view of the HDD.
Figure 3:
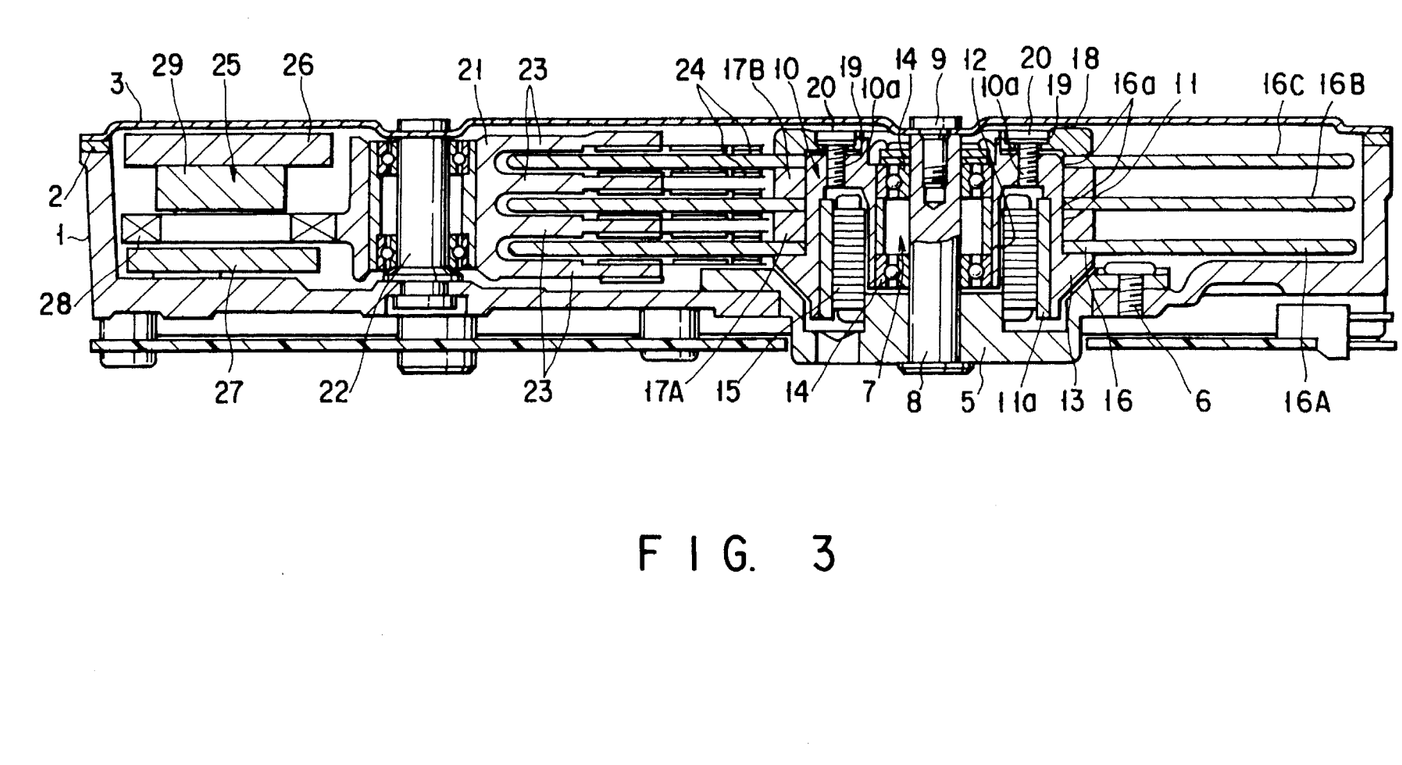
FIG. 3 is a sectional view taken along line III—III of FIG. 2.

As shown in FIGS. 1 to 3, the HDD comprises a rectangular case 1 with a top opening. The top opening is closed by means of a top cover 3 with the aid of a gasket 2. The case 1 contains an inner-rotor motor 7, a plurality of magnetic disks, a carriage 21 supporting magnetic heads 24, a voice coil motor 25 (hereinafter referred to as VCM) for driving the carriage, etc.

A motor bracket 5 is attached to the base of the case 1 by means of screws 6. The motor 7 is set on the bracket 5, and is housed in the case 1. The motor 7 has a motor shaft 8 which is fixed upright on the bracket 5. The upper end of the motor shaft 8 is fixed to the top cover 3 by a screw 9. A rotor 10 of the motor 7 includes a cylindrical rotor yoke 11 and a cylindrical bearing-support portion 12 inside the yoke 11. The respective upper ends of the yoke 11 and the support portion 12 are connected to each other. A flange 13 for use as a magnetic disk receiving portion is formed around the lower part of the rotor yoke 11. The rotor 10 is arranged to surround the motor shaft 8 coaxially, and the bearing-support portion 12 is rotatably supported by means of ball bearings 14 which are mounted on the motor shaft 8.

A permanent magnet 11a is attached to the inner circumferential surface of the rotor yoke 11. Arranged between the magnet 11a and the bearing-support portion 12, moreover, is a stator 15 which includes a core and a coil and is mounted on the motor bracket 5.

Three magnetic disks 16A, 16B and 16C are coaxially supported around the yoke 11 of the rotor 10. Each magnetic disk has a thickness of 0.9 mm, for example, and is formed having a circular hole 16a in the center. The magnetic disks 16A, 16B and 16C are arranged in layers along the axial direction of the rotor 10 with the rotor yoke 11 fitted in their respective center holes 16a. The lower magnetic disk 16A is placed on the flange 13 of the rotor yoke 11. The disk 16B is located in a middle stage, resting on a spacer ring 17A fitted on the outer circumferential surface of the yoke 11, and the disk 16C in an upper stage, resting on a spacer ring 17B.

A fixing ring 18 for use as a fixing member is mounted on the upper end face of the rotor 10 so as to be coaxial with the motor shaft 8. The outer circumferential portion of the ring 18 engages the upper surface of the central portion of the upper magnetic disk 16C, thereby pressing down the three disks and the spacers. Moreover, the fixing ring 18 has, for example, eight holes 19 which are formed at regular intervals in a circle concentric with the ring. Eight tapped holes 10a are formed in the upper end portion of the rotor 10, facing the holes 19, individually.

Screws 20 are passed individually through alternate four of the holes 19 of the fixing ring 18, and are threaded in their corresponding tapped holes 10a of the rotor 10. Thus, the ring 18 and the magnetic disks 16A, 16B and 16C are fixed to the rotor 10. As the rotor 10 rotates, in this arrangement, the disks 16A, 16B and 16C are rotated integrally.

The carriage 21, which carries the magnetic heads 24 thereon, is swingably supported by a bearing on a support shaft 22 which is fixed upright on the bottom wall of the case 1. The carriage 21 has four arm portions 23 which are arranged parallel to one another at intervals in the axial direction of the shaft 22. The arm portions 23 extend toward the magnetic disks 16A, 16B and 16C. The magnetic heads 24 for data recording and retrieval for the magnetic disks 16A, 16B and 16C are supported individually on the respective distal ends of the arm portions 23 through suspensions 40. Each magnetic disk is sandwiched between its corresponding pair of magnetic heads 24.

The VCM 25, which causes the carriage 21 to swing around the support shaft 22, includes top and bottom yokes 26 and 27 spaced and fixed to the case 1, a voice coil 28 mounted on the carriage 21 and situated between the yokes 26 and 27, and a magnet 29 mounted on the top yoke 26 and facing the coil 28. By changing the magnitude and direction of electric current supplied to the coil 28, the VCM 25 changes the swing angle and swing direction of the carriage 21, thereby situating each magnetic head 24 in a desired position on the magnetic disk.

The following is a description of a method for assembling the HDD constructed in this manner, and in particular, a method of setting the magnetic disks on the rotor 10 of the motor 7.

Usually, the diameter of the center hole 16a of each magnetic disk is set to be a little greater than the outer diameter of the rotor yoke 11 so that the disk can be fitted on the yoke 11. In setting the magnetic disks on the rotor yoke 11, the disks are first centered with respect to the yoke in the following manner.

Figure 4A:
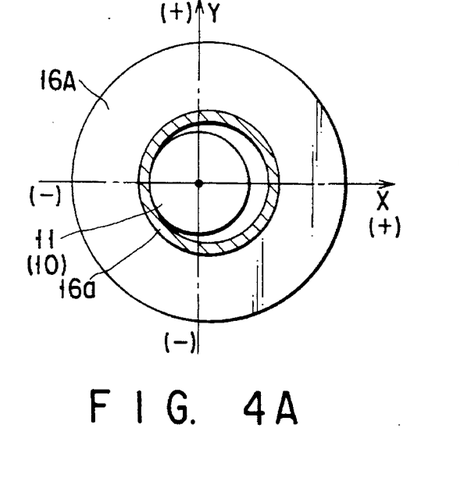
FIGS. 4A to 4E are plan views individually showing processes for aligning a magnetic disk with a rotor.

First, the magnetic disk 16A is fitted on the rotor yoke 11 in a manner such that the yoke 11 is in its center hole 16a. This operation can be automatically performed by holding the magnetic disk by air suction using an automatic fitting machine (not shown). More specifically, a hatched portion of the magnetic disk 16A, as shown in FIG. 4A, is held by air suction by means of the fitting machine, and the disk 16A is fitted on the outer periphery of the rotor yoke 11. After the disk 16A is moved onto the flange 13 of the yoke 11, it is moved forward with respect to a first direction (±X-direction) along the diameter of the disk, e.g., in a +X-direction. When the inner circumferential edge of the disk 16A, which defines the center hole 16a, abuts against the outer circumferential surface of the rotor yoke 11, the movement of the disk 16A is stopped.

Figure 4B:
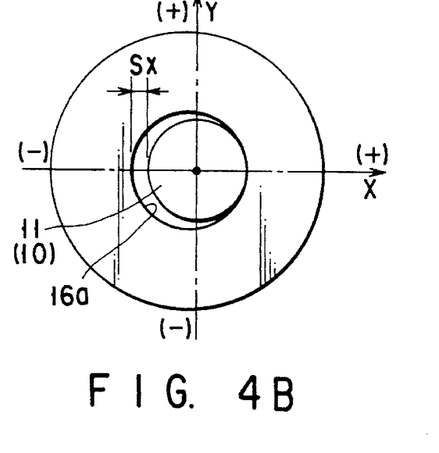

Then, the magnetic disk 16A is moved reversely with respect to the first direction, that is, in a −X-direction, while it is kept held by the automatic fitting machine, as shown in FIG. 4B. When the inner circumferential edge of the disk 16A comes into contact with the outer circumferential surface of the rotor yoke 11, the movement of the disk 16A is stopped. At this time, a moved distance Sx of the disk 16A in the −X-direction is measured and stored by the fitting machine. Thereafter, the magnetic disk 16A is moved for half the distance Sx in the +X-direction without being released from the air suction by the fitting machine.

Figure 4C:
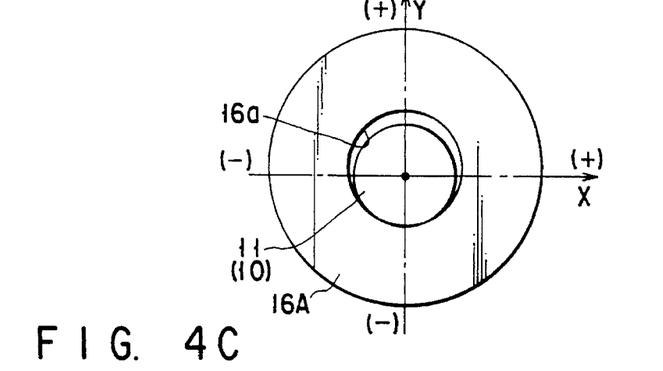

Subsequently, the magnetic disk 16A is moved forward with respect to a second direction (±Y-direction) along the diameter of the disk and perpendicular to the first direction, e.g., in a +Y-direction, without being released from the air suction by the fitting machine, as shown in FIG. 4C. When the inner circumferential edge of the disk 16A comes into contact with the outer circumferential surface of the rotor yoke 11, the movement of the disk 16A is stopped.

Figure 4D:
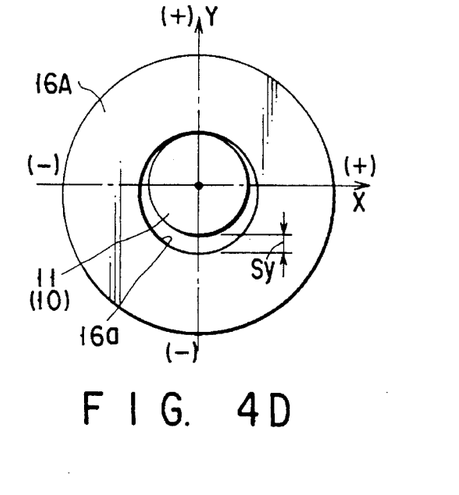

Then, the magnetic disk 16A is moved reversely with respect to the second direction, that is, in a −Y-direction, as shown in FIG. 4D. When the inner circumferential edge of the disk 16A abuts against the outer circumferential surface of the rotor yoke 11, the movement of the disk 16A is stopped. At this time, a moved distance Sy in the −Y-direction is measured and stored by the fitting machine. Thereafter, the magnetic disk 16A is moved for half the distance Sy in the +Y-direction by means of the fitting machine.

Figure 4E:
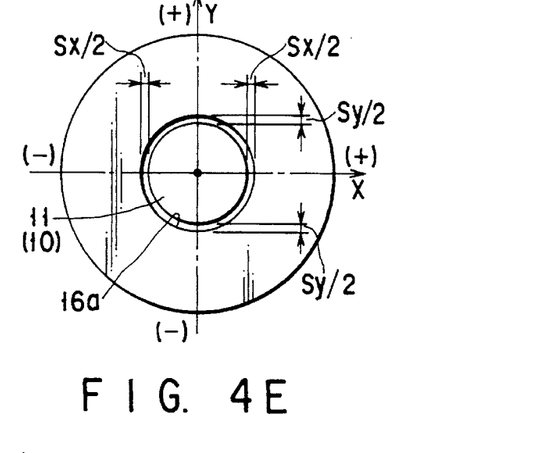

Then, the air suction by the automatic fitting machine is removed. When these processes are executed, centering the magnetic disk 16A is finished, and the disk 16A is mounted on the rotor yoke 11 in a manner such that the gap between the inner circumferential edge of the disk 16A and the outer circumferential surface of the yoke 11 is uniform throughout the circumference. In this state, the center or center of gravity of the magnetic disk 16A is substantially coincident with the center of rotation of the rotor 10 or the motor shaft 8.

Subsequently, the spacer ring 17A and the magnetic disk 16B are fitted in succession on the rotor yoke 11 by means of the automatic fitting machine, and the disk 16B is then centered in the same processes as aforesaid. After the spacer ring 17B and the magnetic disk 16C are fitted in succession on the yoke 11 by means of the fitting machine, moreover, the disk 16C is centered in like manner.

Finally, the fixing ring 18 is placed on the upper end face of the rotor 10, and fixed to the rotor 10 by screwing the screws 20 individually into the tapped holes 10a of the rotor 10 through the holes 19 of the ring 18. Thus, the magnetic disks 16A, 16B and 16C, centered with respect to the rotor yoke 11, are fixed to the rotor 10, whereupon setting the disks on the rotor is finished.

According to this assembling method, the center or center of gravity of each magnetic disk is substantially coincident with the center of rotation of the rotor 10, so that the rotation of the disks can be restrained from being unbalanced, whereby vibrations of the disks and the rotor attributable to unbalanced rotation can be reduced. Even though the rotational speed and number of the magnetic disks are increased for higher performance and larger capacity of the HDD, therefore, the rotation of the disks can be effectively restrained from being unbalanced. Thus, lowering of the positioning accuracy of the magnetic heads, which is attributable to vibrations of the rotor 10, can be prevented, and bad influences upon the performance of the electronic apparatus furnished with the magnetic disk drive can be removed. These bad influences include, for example, vibrations of a keyboard which may be caused by vibrations of the disk drive and give an operator an unpleasant feeling in the case of a compact apparatus, such as a book-type personal computer.

According to this assembling method, moreover, after the magnetic disks are fitted on the rotor, they are centered, so that they can be accurately centered despite manufacturing errors, if any, of the disks, rotor, etc. The HDD and its assembling method described above may be also applied to an HDD which incorporates one magnetic disk, two or four or more.

The following is a description of an HDD and its assembling method according to a second embodiment of the present invention.

The HDD of this embodiment is constructed basically in the same manner as that of the foregoing embodiment, and the former differs from the latter only in the positions of the magnetic disks 16A, 16B and 16C mounted on the rotor 10.

More specifically, according to the second embodiment, the three magnetic disks fitted on the outer circumferential surface of the rotor yoke 11 are fixed to the rotor 10 in a manner such that they are displaced in a direction along their diameter. Besides, the overall weight is balanced by fitting the rotor with a counterweight for unbalance correction in a position symmetrically opposite to the direction of the displacement with respect to the center of rotation of the rotor.

Figure 5:
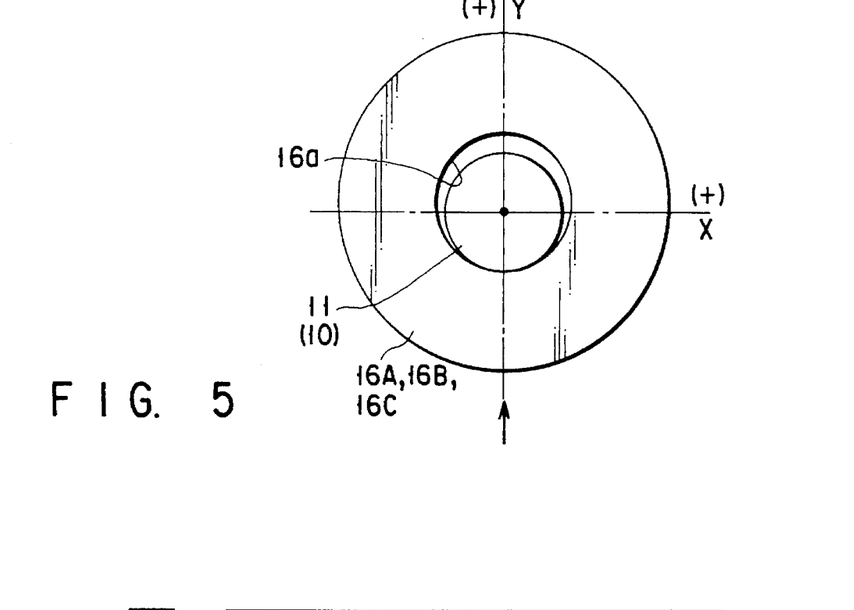
FIG. 5 is a plan view showing a process for making a magnetic disk eccentric to a rotor.
Figure 7:
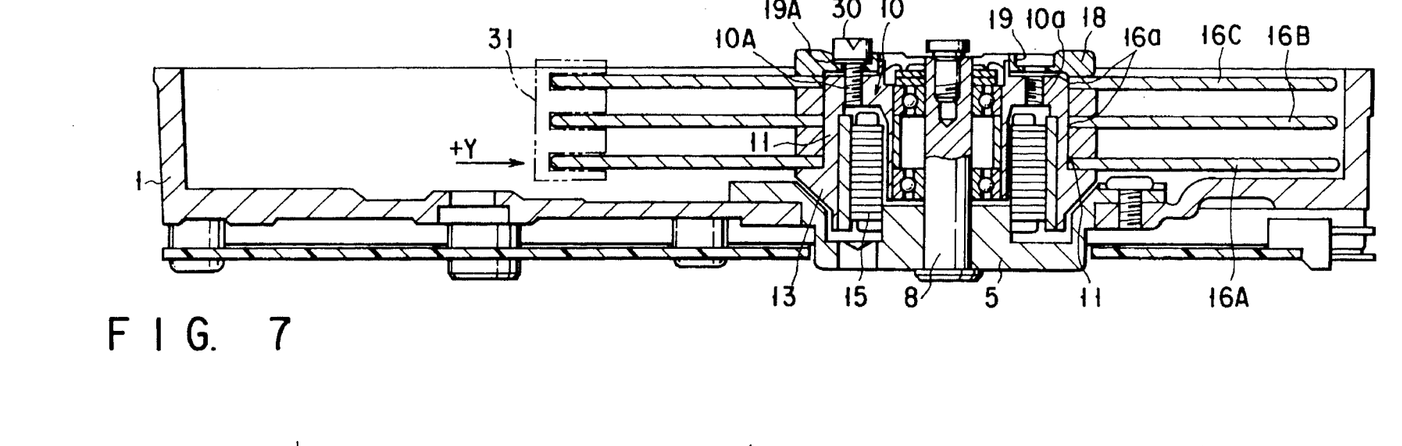
FIG. 7 is a sectional view showing the process for making the magnetic disk eccentric to the rotor.
Figure 8A:
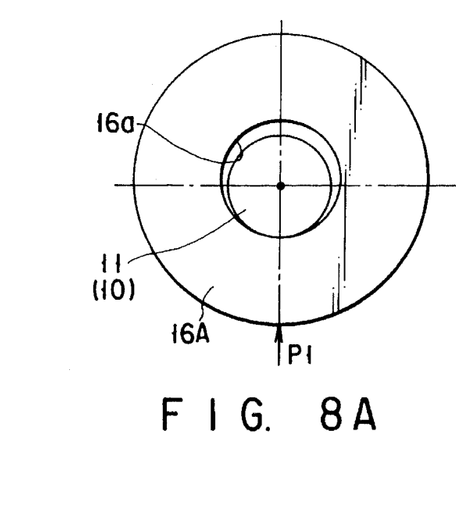
FIGS. 8A to 8C are plan views individually showing processes for making magnetic disks eccentric to a rotor.
Figure 8B:
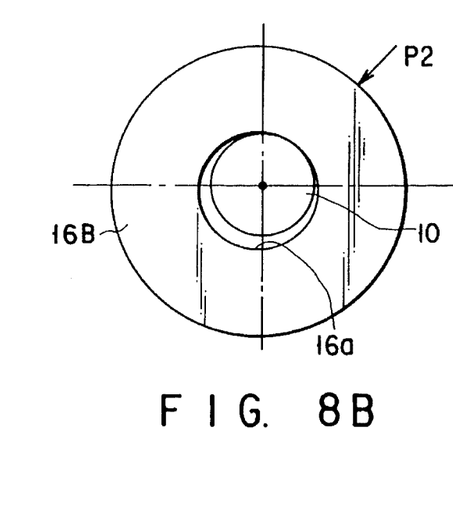
Figure 8C:
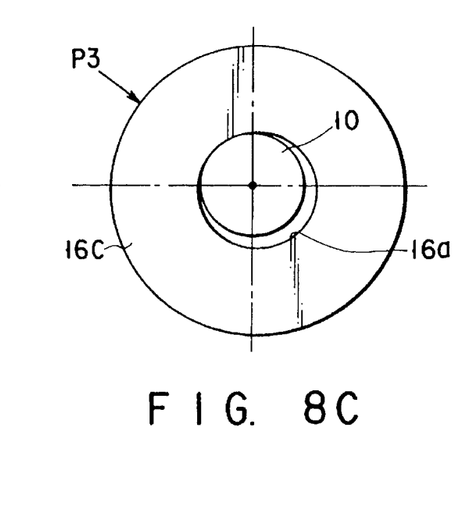

In the process of setting the magnetic disks, the magnetic disk 16A, spacer 17A, disk 16B, spacer 17B, and disk 16C are first fitted successively on the outer circumferential surface of the rotor yoke 11 by means of the automatic fitting apparatus (not shown). Then, the three magnetic disks 16A, 16B and 16C are moved in a specified direction along the diameter of the rotor 10, e.g., in the +Y-direction, by means of a push member 31 of a pusher (not shown) so that the respective inner circumferential edges of the disks are pressed against the outer circumferential surface of the yoke 11. Thereupon, that portion of the inner circumferential edge of each magnetic disk which is diametrically opposite to the forward end with respect to the pushing direction is brought into contact with the outer circumferential surface of the rotor yoke 11. Before this is done, the rotating position of the rotor 10 is adjusted so that the direction of a line passing through the center of rotation of the rotor 10 and one tapped hole 10A is coincident with the pushing direction or +Y-direction.

Figure 6:
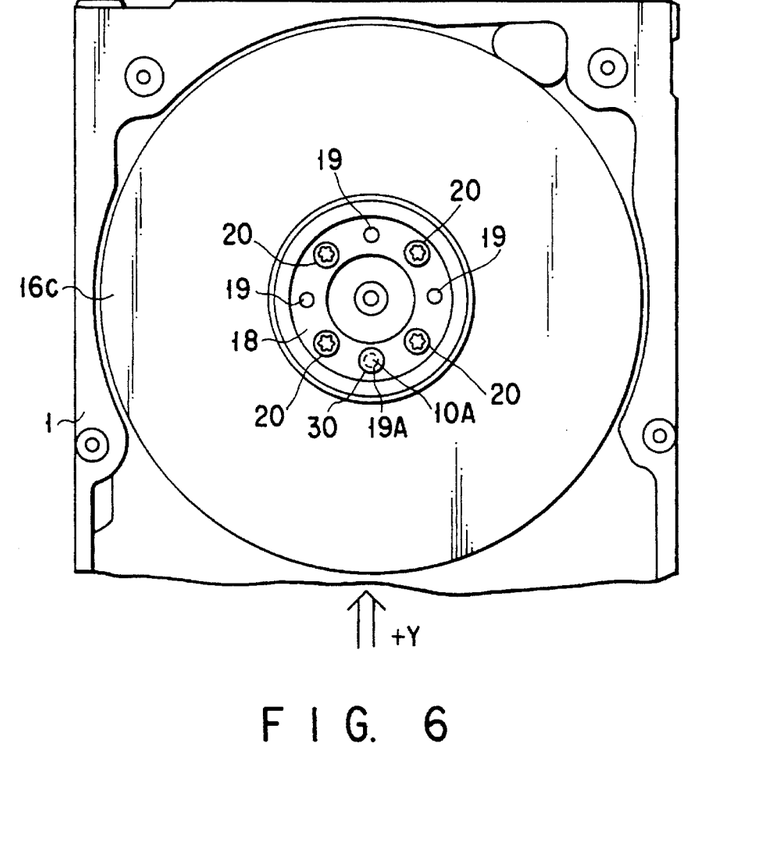
FIG. 6 is a plan view of an essential part of the HDD, showing the eccentric magnetic disk and a counterweight for unbalance correction.

Thereafter, the fixing ring 18 is fixed to the upper end face of the rotor 10 by means of the four screws 20, and the three magnetic disks 16A, 16B and 16C and the spacer rings 17A and 17B are fixed to the rotor 10. The ring 18 is fixed to the rotor 10 by utilizing the other tapped holes 10a than the aforesaid hole 10A.

Subsequently, the rotor 10 is rotated, and the degree of unbalance of the rotation of the magnetic disks 16A, 16B and 16C is measured. This measurement is conducted in the following manner, for example.

An acceleration sensor is attached to a suitable position in the magnetic disk drive, and the acceleration of the rotation of the magnetic disks 16A, 16B and 16C is observed. Based on the observed acceleration, the degree (force) of unbalance is calculated as follows:

$$T = m \cdot e = M \cdot G / \omega^2,$$

as we have $$M \cdot G = m \cdot e \cdot \omega^2,$$

where m, e, and ω are the mass, eccentricity, and rotational speed of the rotating body (magnetic disk), respectively, G is the acceleration observed by means of the acceleration sensor, M is the overall weight of the magnetic disk drive, and T (m·e) is the degree (force) of unbalance.

The unbalance degree T can be calculated because M, G, and ω are known values.

Then, the counterweight for unbalance correction, e.g., a screw 30, is prepared having a weight heavy enough to compensate for the measured unbalance degree. The screw 30 is inserted into the tapped hole 10A, which is situated diametrically opposite to the forward end of each magnetic disk with respect to the pushing direction across the shaft 8 of the motor 7, through that hole 19A which faces the hole 10A. The mounting position of the screw 30 is on the same side as the position where the inner circumferential edge of each magnetic disk is in contact with the outer circumferential surface of the rotor yoke 11. In other words, the tapped hole 10A is situated near that part of the outer circumferential surface of the rotor 10 against which the inner circumferential edge of each disk is pressed. Thus, four of the eight holes 19 in the ring 18 are used for the fixation by means of the screws 20, and one of the remaining four holes 19 for the attachment of the screw 30 serving as the counterweight for unbalance correction.

Since the respective weights of the magnetic disks 16A, 16B and 16C and the unbalance correction counterweight 30 are distributed to positions symmetrical with respect to the motor shaft 8, the disks are restrained from being unbalanced as they rotate. Thus, vibrations attributable to unbalanced rotation can be reduced. According to the method described above, moreover, the unbalance is corrected by means of the counterweight 30 after the unbalance degree is measured with the magnetic disks fixed to the rotor. Therefore, the magnetic disks and the whole rotor can be accurately balanced despite manufacturing errors, if any, of the disks or rotor.

Let it be supposed an unbalance force of F=0.138N is observed in measuring the unbalance of rotation after fitting the magnetic disks on the rotor 10. If the radius of the screw 30 for use as the counterweight for unbalance correction is 7 mm, the weight W of the screw is obtained as follows:

$$F = W \times 10^{-3} \times 7 \times 10^{-3} \times (2\pi \times 60)^2,$$

$$W = 0.14 \text{ (g)}.$$

The unbalance force need not be reduced perfectly to zero, and the vibrations can be reduced by preparing screws of various shapes and materials for the screw 30 and alternatively using the one with which the unbalance force is nearest to zero. The counterweight for unbalance correction is not limited to a screw, and may be formed of a component with any other construction.

According to the HDD assembled by the method described above, as in the first embodiment, the rotation of the magnetic disks can be effectively restrained from being unbalanced. Thus, lowering of the positioning accuracy of the magnetic disks, which is attributable to vibrations of the disks and the rotor 10, can be prevented, and bad influences upon the performance of the electronic apparatus furnished with the magnetic disk drive can be removed. The HDD and its assembling method described above may be also applied to an HDD which incorporates one magnetic disk, two or four or more.

The following is a description of an HDD and its assembling method according to a third embodiment of the present invention.

The HDD of this embodiment is constructed basically in the same manner as that of the first embodiment, and the former differs from the latter only in the positions of the magnetic disks 16A, 16B and 16C mounted on the rotor 10. More specifically, according to the third embodiment, three or more magnetic disks are fitted on the rotor in the following manner. The magnetic disks are moved toward the central axis of the motor shaft along lines defining angles of the same value which is obtained by dividing 360 degrees by the number of the magnetic disks so that the inner circumferential edge of each disk is pressed against the outer circumferential surface of the rotor. In this state, the magnetic disks are fixed to the rotor.

In mounting the three magnetic disks 16A, 16B and 16C on the rotor 10, for example, the disks are pushed toward the central axis of the motor shaft 8 along lines defining angles of 120° which is obtained by dividing 360 degrees by the number of the disks, i.e., three, so that the inner circumferential edge of each disk is pressed against the outer circumferential surface of the rotor yoke 11 of the rotor 10. The magnetic disks 16A, 16B and 16C are fixed in this state.

More specifically, as shown in FIGS. 8A to 10, the magnetic disk 16A, spacer 17A, disk 16B, spacer 17B, and disk 16C are first fitted successively on the outer circumferential surface of the rotor yoke 11 by means of the automatic fitting apparatus (not shown). Then, the magnetic disks 16A, 16B and 16C are pushed in directions P1, P2 and P3, respectively, so that the inner circumferential edge of each disk is pressed against the yoke 11. In this case, the three directions P1, P2 and P3 are at an angular distance of 120° from one another in the circumferential direction of the rotor 10.

Figure 10:
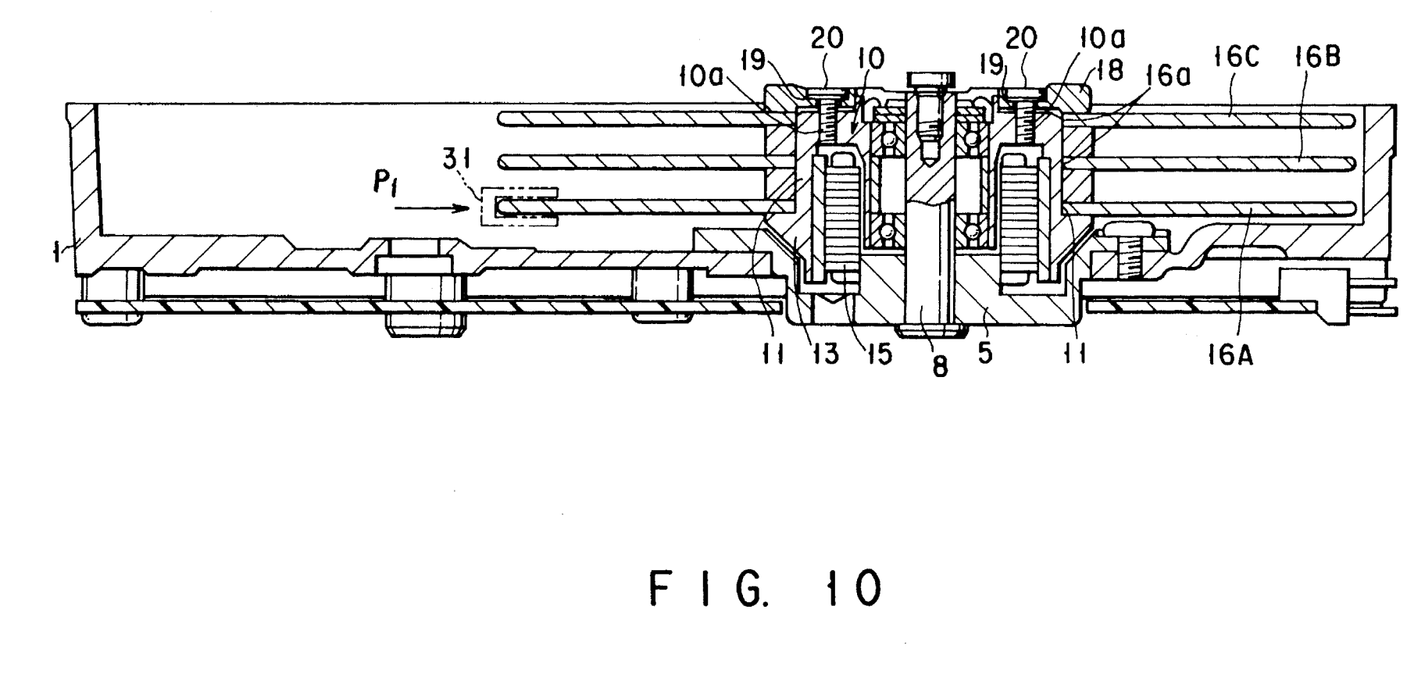
FIG. 10 is a sectional view showing the process for making the magnetic disks eccentric to the rotor.

The magnetic disks 16A, 16B and 16C are pressed by means of the push member 31 for pushing the outer periphery of each disk, as shown in FIG. 10. Therefore, a space for the insertion of the member 31 is secured in the case 1. Opposite side walls of the case 1 are formed having recesses 42 and 43, individually, which receive the push member 31 when the magnetic disks are pushed in the directions P2 and P3, for example. Pushing one of the disks in the direction P1 is carried out before mounting the carriage 21 in the case 1. In this case, therefore, a space for the carriage 21 can be utilized for the pushing operation.

After the three magnetic disks 16A, 16B and 16C are displaced in the directions P1, P2 and P3, respectively, the fixing ring 18 is fixed to upper end face of the rotor 10 by means of the four screws 20, whereby the three disks and the spacer rings 17A and 17B are fixed to the rotor 10. Thereupon, setting the magnetic disks on the rotor 10 is finished.

According to the assembling method and the HDD described above, the unbalance of rotation is greatest with respect to the individual magnetic disks 16A, 16B and 16C. Synthetically, however, the respective unbalance forces of the individual disks cancel one another, so that the overall unbalance force is reduced. Thus, the rotation of the magnetic disks 16A, 16B and 16C can be restrained from being unbalanced, so that vibrations of the HDD attributable to unbalance can be reduced. Since the magnetic disks themselves are balanced as a whole, moreover, it is unnecessary to provide a counterweight for correction, such as the one used in the foregoing embodiments, so that the number of components can be reduced.

In the third embodiment, the magnetic disks used are not limited to three in number, and may be four or more. In the case of a four or five-disk arrangement, for example, the magnetic disks can be fixed by only being displaced toward the central axis of the motor shaft 8 along lines defining angels of 90° or 75°, respectively.

In the case where five or more magnetic disks are used, they may be classified into a plurality of groups each including two or more magnetic disks, at least one of the groups including three or more magnetic disks, so that the magnetic disks in each group are displaced toward the central axis of the motor shaft along lines defining angles of the same value which is obtained by dividing 360 degrees by the number of the magnetic disks in the group. In the case of the five-disk arrangement, for example, the magnetic disks may be classified into two groups, a first group including three disks and a second group including two disks, so that the three disks in the first group are displaced toward the central axis of the motor shaft along lines defining angles of 120°, and the two disks in the second group along lines defining angles of 180°. According to this arrangement, the magnetic disks and the whole rotor can be balanced by balancing the magnetic disks in each group in rotation.

Figure 9:
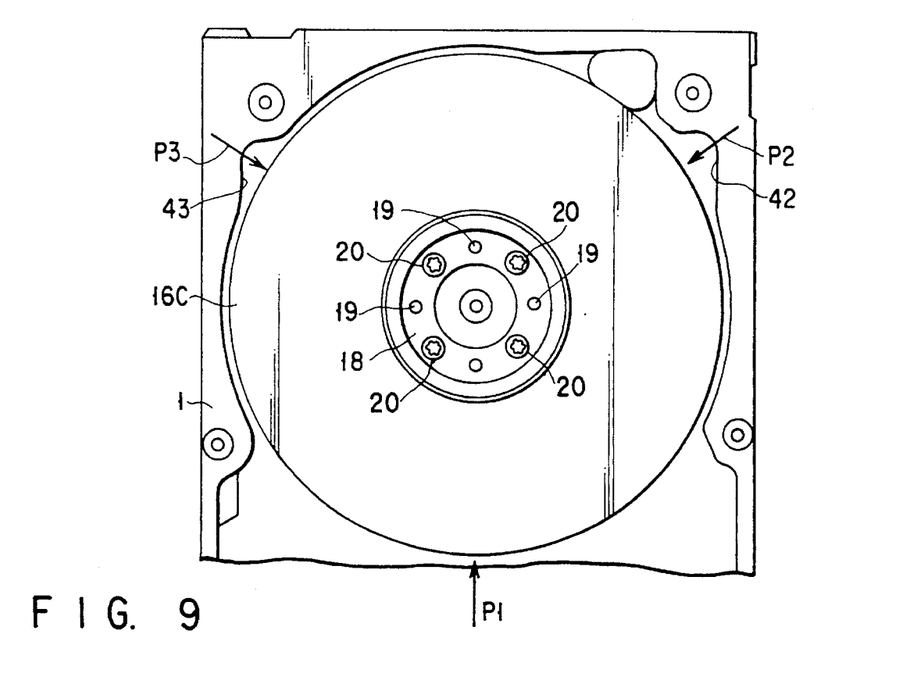
FIG. 9 is a plan view of an essential part of the HDD, showing the eccentric magnetic disk.
Figure 11:
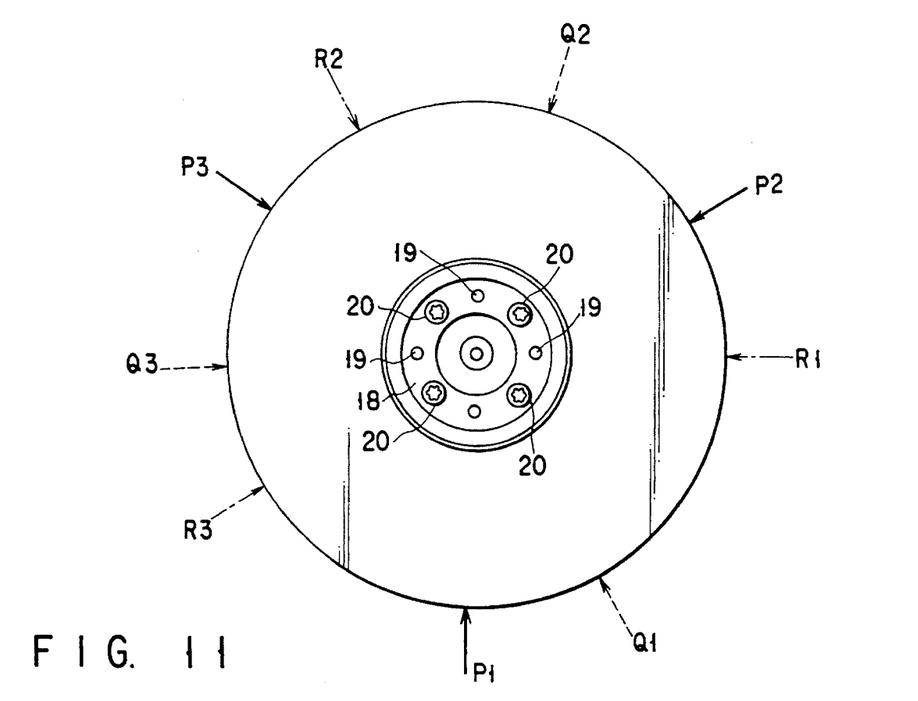
FIG. 11 is a plan view showing directions in which magnetic disks are pushed according to a method for setting nine magnetic disks on a rotor.

Likewise, in the case of a nine-disk arrangement, the magnetic disks may be classified into three groups each including three disks so that the three disks in each group are fixed with being pressed against the rotor from three directions at intervals of 120°. In this case, the disks may be pressed against the rotor from the same three directions P1, P2 and P3 for all the groups, as shown in FIG. 9. Alternatively, the disks may be pressed against the rotor from three directions for each group, that is, the three disks in a first group may be pressed from the directions P1, P2 and P3, the three disks in a second group from the directions Q1, Q2 and Q3, and the three disks in a third group from the directions R1, R2 and R3, as shown in FIG. 11.

In the case where a plurality of magnetic disks are arranged in layers in the axial direction of the rotor, moreover, the disks constituting each group may be selected as required. In the case where six magnetic disks are classified into two groups each including three disks, for example, the first and second groups may be formed of first to third disks and fourth to sixth disks, respectively, or of the first, third, and fifth disks and the second, fourth, and sixth disks, respectively.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A magnetic disk drive comprising:

a motor having a substantially cylindrical rotor rotatable around a motor shaft, the rotor having a diameter and an outer circumferential surface;

a magnetic disk having an inner circumferential edge defining a center hole with a diameter in which the rotor is inserted, the diameter of the rotor being smaller than the diameter of the center hole, the magnetic disk being fitted on the outer circumferential surface of the rotor and being displaced in a direction along the diameter of the rotor so that a portion of the inner circumferential edge of the magnetic disk defining the center hole is pressed against a portion of the outer circumferential surface of the rotor;

a fixing member mounted on the rotor and fixing the magnetic disk to the rotor; and a counterweight for correcting the balance of the magnetic disk in rotation, the counterweight being mounted on the fixing member adjacent to the portion of the outer circumferential surface of the rotor against which the inner circumferential edge of the magnetic disk is pressed.

2. A magnetic disk drive according to claim 1, wherein said fixing member includes a fixing ring mounted coaxially on the rotor and having a plurality of holes therein arranged at regular intervals on a circle concentric with the motor shaft, and said counterweight includes a screw screwed into the rotor through one of the holes.

3. A method for assembling a magnetic disk drive which includes a motor having a substantially cylindrical rotor rotatable around a motor shaft, a magnetic disk having a center hole in which the rotor is inserted and fitted on the outer circumferential surface of the rotor, and a fixing member fixing the magnetic disk to the rotor, said method comprising the steps of:

mounting the magnetic disk on the rotor in a manner such that the rotor is inserted in the center hole;

moving the mounted magnetic disk in a direction along the diameter of the rotor so that the inner circumferential edge of the magnetic disk defining the center hole is pressed against the outer circumferential surface of the rotor;

fixing the pressed magnetic disk to the rotor by means of the fixing member;

rotating the fixed magnetic disk and the rotor and measuring the degree of unbalance of the magnetic disk and the rotor in rotation; and mounting a counterweight for correcting the measured unbalance degree of the fixing member, in the vicinity of that region of the outer circumferential surface of the rotor against which the inner circumferential edge of the magnetic disk is pressed.

4. A magnetic disk drive comprising:

a motor having a substantially cylindrical rotor rotatable around a central axis of a motor shaft, the rotor having a diameter and an outer circumferential surface; and three or more magnetic disks each having an inner circumferential edge defining a center hole with a diameter in which the rotor is inserted, the diameter of the rotor being smaller than the diameter of the center hole of the magnetic disks, the magnetic disks being fitted on the outer circumferential surface of the rotor and each magnetic disk being displaced toward the central axis of the motor shaft along a different line defining angles of the same value which is obtained by dividing 360 degrees by the number of the magnetic disks such that the inner circumferential edge of each magnetic disk defining the center hole is pressed against the outer circumferential surface of the rotor at different positions.

5. A method of assembling a magnetic disk drive which includes a motor having a substantially cylindrical rotor rotatable around a motor shaft, three or more magnetic disks each having a center hole in which the rotor is inserted and fitted on the outer circumferential surface of the rotor, and a fixing member fixing the magnetic disk to the rotor, comprising steps of:

mounting the magnetic disks on the rotor in a manner such that the rotor is inserted in the respective center holes of the disks;

moving the mounted magnetic disks toward the central axis of the motor shaft, respectively along lines defining angles of the same value which is obtained by dividing 360 degrees by the number of the magnetic disks so that the inner circumferential edge of each magnetic disk defining the center hole is pressed against the outer circumferential surface of the rotor; and fixing the pressed magnetic disks to the rotor by means of the fixing member.

6. A magnetic disk drive comprising:

a motor having a substantially cylindrical rotor rotatable around a central axis of a motor shaft, the rotor having a diameter and an outer circumferential surface; and five or more magnetic disks each having an inner circumferential edge defining a center hole with a diameter in which the rotor is inserted, the diameter of the rotor being smaller than the diameter of the center hole of the magnetic disks, the magnetic disks being fitted on the outer circumferential surface of the rotor and being classified into two or more groups each including two or more magnetic disks, at least one of the groups including three or more magnetic disks, wherein each of the magnetic disks in each group is displaced toward the central axis of the motor shaft along a different line defining angles of the same value which is obtained by dividing 360 degrees by the number of the magnetic disks in the group such that the inner circumferential edge of each magnetic disk defining the center hole is pressed against the outer circumferential surface of the rotor at different positions.

7. A method of assembling a magnetic disk drive which includes a motor having a substantially cylindrical rotor rotatable around a motor shaft, five or more magnetic disks each having a center hole in which the rotor is inserted and fitted on the outer circumferential surface of the rotor, and a fixing member fixing the magnetic disk to the rotor, said method comprising the steps of:

mounting the magnetic disks on the rotor in a manner such that the rotor is inserted in the respective center holes of the disks;

classifying the magnetic disks into two or more groups each including two or more magnetic disks, at least one of the groups including three or more magnetic disks;

moving the magnetic disks in each group toward the central axis of the motor shaft, respectively along lines defining angles of the same value which is obtained by dividing 360 degrees by the number of the magnetic disks in the group so that the inner circumferential edge of each magnetic disk defining the center hole is pressed against the outer circumferential surface of the rotor; and fixing the pressed magnetic disks to the rotor by means of the fixing member.

8. A method of assembling a magnetic disk drive which includes a motor having a substantially cylindrical rotor rotatable around a motor shaft, a magnetic disk having a center hole in which the rotor is inserted and fitted on the outer circumferential surface of the rotor, and a fixing member fixing the magnetic disk to the rotor, said method comprising the steps of:

mounting the magnetic disk on the rotor in a manner such that the rotor is inserted in the center hole;

moving the mounted magnetic disk in a first direction along the diameter of the rotor so that the inner circumferential edge of the magnetic disk defining the center hole is pressed against the outer circumferential surface of the rotor;

moving the magnetic disk in a second direction opposite to the first direction so that the inner circumferential edge is pressed against the outer circumferential surface of the rotor;

measuring a first moved distance of the magnetic disk in the second direction;

moving the magnetic disk for half the measured first moved distance in the first direction;

moving the magnetic disk in a third direction along the diameter of the rotor and perpendicular to the first direction so that the inner circumferential edge of the magnetic disk is pressed against the outer circumferential surface of the rotor;

moving the magnetic disk in a fourth direction opposite to the third direction so that the inner circumferential edge is pressed against the outer circumferential surface of the rotor;

measuring a second moved distance of the magnetic disk in the fourth direction;

moving the magnetic disk for half the measured second moved distance in the third direction; and fixing the magnetic disk, moved for half the first moved distance and half the second moved distance, to the rotor by means of the fixing member.

* * * * *